(12) United States Patent
Macchia et al.

(10) Patent No.: US 9,612,106 B2
(45) Date of Patent: Apr. 4, 2017

(54) DEVICE AND METHOD FOR MEASURING THE RUNNING GEAR OF A MOTOR VEHICLE

(75) Inventors: Adriano Macchia, Munich (DE); Christian Wagmann, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 361 days.

(21) Appl. No.: 14/118,110

(22) PCT Filed: May 22, 2012

(86) PCT No.: PCT/EP2012/059470
§ 371 (c)(1),
(2), (4) Date: Nov. 15, 2013

(87) PCT Pub. No.: WO2012/160056
PCT Pub. Date: Nov. 29, 2012

(65) Prior Publication Data
US 2014/0176703 A1 Jun. 26, 2014

(30) Foreign Application Priority Data

May 24, 2011 (DE) .......... 10 2011 076 394
Nov. 17, 2011 (DE) .......... 10 2011 086 548

(51) Int. Cl.
*G01B 11/00* (2006.01)
*G01B 11/275* (2006.01)
*B60R 1/00* (2006.01)

(52) U.S. Cl.
CPC ............... *G01B 11/00* (2013.01); *B60R 1/00* (2013.01); *G01B 11/275* (2013.01);
(Continued)

(58) Field of Classification Search
CPC G01B 11/00; G01B 11/275; G01B 2210/143; G01B 2210/26; G01B 2210/283; G01B 2210/30; B60R 1/00
See application file for complete search history.

(56) References Cited

U.S. PATENT DOCUMENTS 5,535,522 A 7/1996 Jackson
5,731,870 A 3/1998 Bartko et al.
(Continued)

FOREIGN PATENT DOCUMENTS

CN 1157078 A 8/1997
CN 1714274 A 12/2005
(Continued)

OTHER PUBLICATIONS

International Search Report for PCT/EP2012/059470, dated Aug. 2, 2012.

*Primary Examiner* — Thai Tran
*Assistant Examiner* — Christopher T Braniff
(74) *Attorney, Agent, or Firm* — Gerard Messina

(57) ABSTRACT

An apparatus for measuring the running gear of a motor vehicle includes: a left measuring unit for positioning on a left side of the motor vehicle, in such a way that a measurement target on a left front wheel and a measurement target on a left rear wheel of the motor vehicle can be sensed from the left measuring unit; a right measuring unit for positioning on a right side of the vehicle, in such a way that a measurement target on a right front wheel and a measurement target on a right rear wheel of the motor vehicle can be sensed from the right measuring unit; and an evaluation device embodied to identify the vehicle geometry data from images of the measurement targets of the front wheels and
(Continued)

of the measurement targets of the rear wheels by way of a comparison with reference images of the measurement targets.

15 Claims, 4 Drawing Sheets

(52) U.S. Cl.
CPC .... *G01B 2210/143* (2013.01); *G01B 2210/26* (2013.01); *G01B 2210/283* (2013.01); *G01B 2210/30* (2013.01)

(56) References Cited

U.S. PATENT DOCUMENTS

| | | |
|---|---|---|
| 5,943,783 A | 8/1999 | Jackson |
| 2002/0080343 A1* | 6/2002 | Bux .................... G01B 11/275 356/139.09 |
| 2003/0147068 A1* | 8/2003 | Corghi ............... G01B 11/2755 356/139.09 |
| 2006/0152711 A1 | 7/2006 | Dale et al. |
| 2006/0206236 A1* | 9/2006 | Smyth .................. G06K 7/0008 700/225 |

FOREIGN PATENT DOCUMENTS

| | | |
|---|---|---|
| CN | 101124454 A | 2/2008 |
| CN | 101160505 A | 4/2008 |
| DE | 102009028796 A | 4/2010 |
| EP | 1 184 640 | 3/2002 |
| WO | WO 2010/028946 | 3/2010 |
| WO | WO2010028946 A1 * | 3/2010 |

* cited by examiner

DEVICE AND METHOD FOR MEASURING THE RUNNING GEAR OF A MOTOR VEHICLE

BACKGROUND OF THE INVENTION

1. Field of the Invention

The invention relates to an apparatus and a method for measuring the running gear of a motor vehicle.

2. Description of the Related Art

In known apparatuses for running gear measurement having multiple measuring units, it is necessary for their position with respect to one another to be known in the context of running gear measurement. For this, the measuring units are often mounted in a known position with respect to one another, for example on a frame. Such measurement apparatuses are relatively inflexible. In other measurement apparatuses whose measuring units can continuously determine position with respect to one another, a plurality of elements for the measuring units are necessary for the purpose, making such measurement apparatuses complex and expensive.

Published European patent application document EP 1 184 640 A2 discloses a running gear measurement device having four measurement heads for determining the wheel positions of the wheels of a motor vehicle on a measuring station. Each of the four measuring heads of published European patent application document EP 1 184 640 A2 has at least one camera, which is directed onto a measurement target disposed in the field of view of the camera, positioned in a fixed relationship with respect to the wheel of the vehicle, and aligned parallel to the wheel plane. The images of the camera are evaluated by an evaluation device in order to determine the spatial location of the measurement target, and thus of the wheel, with reference to the position of the camera or the measuring head. The running gear measurement device of published European patent application document EP 1 184 640 A2 encompasses an optical reference system for calibrating the measuring heads of the running gear measurement device with reference to the position of the measuring heads with respect to one another. A running gear measurement device of this kind is already expensive because of the obligatory presence of four measuring heads.

BRIEF DESCRIPTION OF THE DRAWINGS

The object of the present invention is therefore to describe a flexible apparatus and a flexible method for measuring the running gear of a motor vehicle, which are economical and which enable simple and reliable measurement of the motor vehicle running gear with a small number of components.

According to the present invention, the number of components of the vehicle measurement apparatus is reduced. Only two measuring units are necessary, which moreover can be portable, which considerably simplifies positioning thereof with respect to the vehicle. The vehicle measurement apparatus according to the present invention makes possible reliable and error-free measurement.

Figure 1:
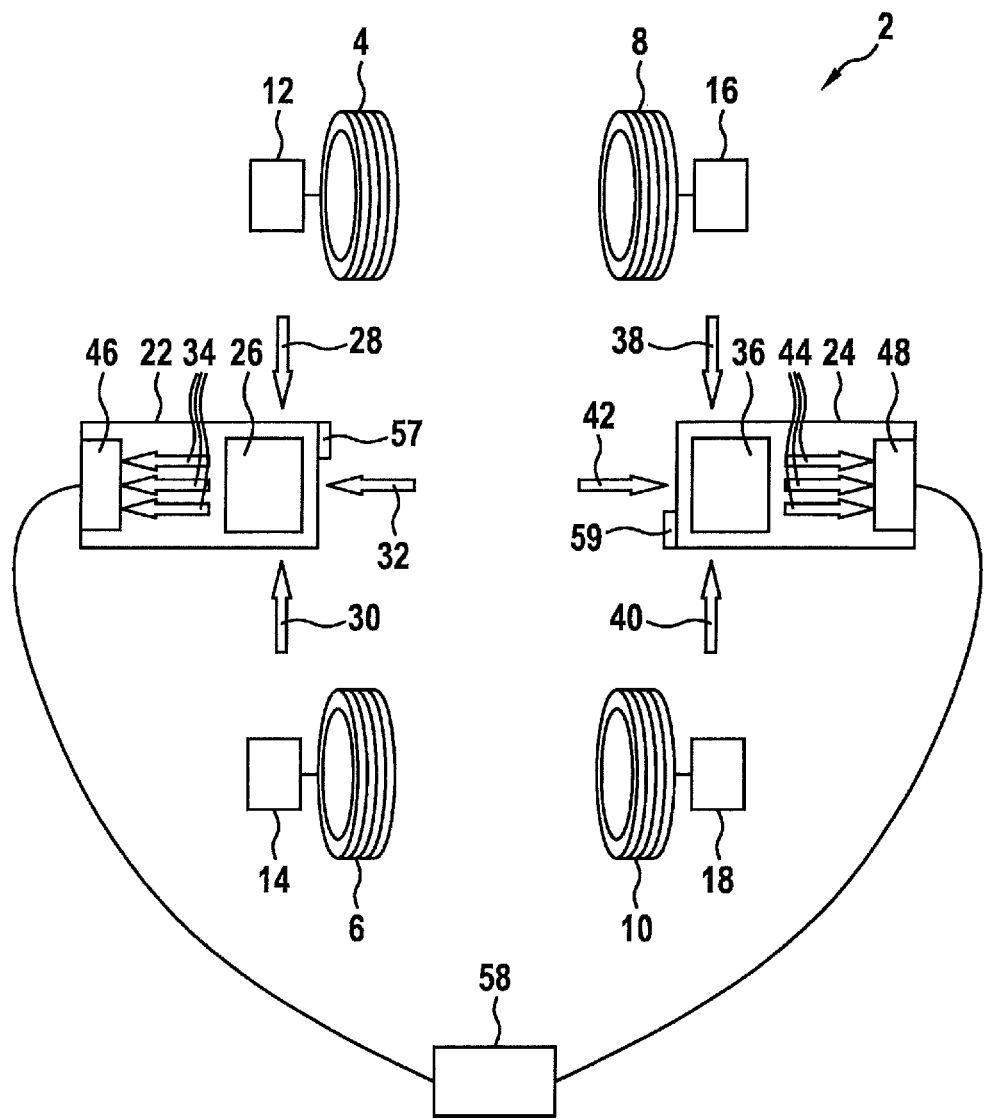

The apparatus for running gear measurement encompasses only two measuring units, which measure the alignment of the rear and the front wheels of a motor vehicle by way of targets mounted on the wheels.

A measuring unit of the apparatus according to the present invention for running gear measurement encompasses a reference target visible from the measuring unit positioned on the respective other side of the motor vehicle, an image acquisition unit, and an optical device. The measuring unit can be positioned, for example, in a longitudinal position between the measurement targets of a respective side. For example, the left measuring unit can be positionable on the left side of the motor vehicle at a longitudinal position between a measurement target on a left rear wheel and a measurement target on a left front wheel of the motor vehicle. It is furthermore possible to position the measuring units, for example, oppositely in a transverse vehicle direction, the reference targets of the respective measuring units thus being oppositely located in the transverse vehicle direction.

The optical device is capable of directing onto the image acquisition unit images of at least three measurement and reference targets that are disposed at various positions in space.

The measurement targets are, in particular, plates on which target features are mounted in a specific disposition. These target features can be disposed on the target in any shape, number, and disposition, and constitute the geometry of the target. The measurement targets are fastened on a wheel in a known position, for example via an adapter. In particular, the plate-shaped measurement targets are not located in the direction of the longitudinal vehicle axis or parallel to the respective wheel axis, but instead form an angle with the longitudinal vehicle axis and/or with the respective wheel axis. This angle is selected in particular to be sufficiently large that the target features on the plate-shaped measurement targets can be readily recognized by the measuring units. In the case of measuring units disposed between the measurement targets on the front and rear wheels, the angle of the plane of the plate-shaped measurement targets is greater than 45°, referred to the longitudinal vehicle axis or to the respective wheel axis.

The reference targets are mounted on the measuring units in such a way that they are visible from the respective measuring unit positioned on the other side of the vehicle.

The images of the measurement targets are evaluated by the evaluation device by being compared with reference images of the measurement targets. These reference images are made up of images of the measurement targets that were acquired at known angles and known distances, and were stored in the evaluation device. Thanks to a comparison between the acquired images and the reference images, the orientation and position of the measurement targets, and thus also of the wheels, relative to the measuring unit can be identified. In order to identify the vehicle geometry data from the identified position of the wheels relative to the measuring unit, it is furthermore necessary to determine the position of the measuring units relative to one another, in order to determine the alignment of the left measurement targets relative to the right measurement targets. The evaluation device is therefore furthermore embodied to identify the relative position of the reference targets. The reference targets, like the measurement targets, can be mounted in known fashion on the respective measuring device. From this known position of the reference target with respect to the measuring device, the position of the measuring device can furthermore be determined.

In a first exemplifying embodiment, the image acquisition unit has an image acquisition surface having a first image region, having a second image region, and having a third image region, and the optical device is disposed and embodied so as to direct the image of the measurement target of the front wheel onto the first image region, the image of the measurement target of the rear wheel onto the second image region, and the image of the reference target onto the third image region.

With an image acquisition unit of this kind it is possible to acquire images simultaneously from three different targets. The three targets to be measured by the measuring unit are each imaged by the optical device onto separate image regions of the image acquisition surface of the image acquisition unit. This makes possible rapid evaluation of the images of the measurement targets and of the reference target which are imaged by the optical device onto different, predetermined image regions of the image acquisition surface. The optical device prevents the images of the measurement target and of the reference target from being incident together onto one image region, the result of which would be that before evaluation, the images would first need to be associated with the respective measurement or reference target.

In a further exemplifying embodiment, the evaluation device is embodied in such a way that it compares the acquired images of the reference targets with reference images of the reference targets, and identifies therefrom the relative position of the reference targets.

A comparison between an image of the reference target and a reference image of the reference target which was acquired at a known angle and distance with respect to the imaging device makes it possible to determine the actual position of the reference target. The relative position of the reference target can thereby be determined particularly simply and reliably, and furthermore no additional components are needed in the running gear measurement apparatus.

In a further exemplifying embodiment the reference targets are each embodied in point-like fashion, in particular in the form of an LED, and the spacing of the measuring units in the transverse vehicle direction is known. In addition, each measuring unit possesses an inclination sensor. The evaluation device is embodied so that it identifies the vehicle geometry data, and in that context in order to determine the position of the measuring units with respect to one another compares the images of the reference targets with reference images, and utilizes the known spacing of the measuring units in the transverse vehicle direction and the inclination of the two measuring units.

A point-like reference target represents a very simple and economical form of reference target. When a reference target of this kind is used, it is additionally necessary to determine the inclination of the measuring unit, and to know the spacing of the measuring units in the transverse vehicle direction, in order to be able to identify the position of the measuring units with respect to one another.

In a further exemplifying embodiment, the reference targets are each embodied as at least two light spots, in particular LEDs, disposed in a line and having a predetermined spacing, and each of the measuring units possesses an inclination sensor. A reference target of this kind is a 2D target, with which the spacing as well as the angular displacement of the measuring units with respect to one another can be determined by comparing them with reference images of the reference target. For calculation of the geometry data of the vehicle by the evaluation unit, when a 2D target of this kind is used all that is needed is the inclination, identified by the inclination sensor, of the measuring units, but not the previously identified spacing of the measuring units with respect to one another in the transverse vehicle direction.

In a further exemplifying embodiment, the reference targets are embodied as multiple light spots, in particular LEDs, in one surface at respectively predetermined spacings from one another, or as light spots, in particular LEDs, present in different surfaces and planes. A reference target of this kind represents a 3D target. When a 3D target is used it is possible to determine the orientation in space, i.e. the angular displacement, as well as the spacings in the longitudinal and transverse vehicle directions, as well as the inclination of the measuring units with respect to one another, by way of a comparison with a reference image, without requiring for that purpose an additional inclination sensor or a knowledge of the spacing of the measuring units with respect to one another.

In a further exemplifying embodiment, there is additionally provided on at least one of the measuring units a motion sensor that, when it detects a motion of at least one of the measuring units, triggers imaging of the measurement and reference targets by the image acquisition units. A motion sensor of this kind can be made up, for example, of a pendulum, a motion of one of the measuring units resulting in a deflection of the pendulum. This ensures that as soon as the position of the measuring units, relative to one another or to the measurement targets, changes, that position is identified again by imaging of the measurement and reference targets, and the vehicle geometry data thus always correspond to the current situation.

In a further exemplifying embodiment, a motion sensor is additionally provided which, when it detects a motion of at least one of the measurement or reference targets or a motion of the motor vehicle, triggers imaging of the measurement and reference targets by the image acquisition units. The result of this is that a change in the position of the measurement or reference targets or of the motor vehicle results in a re-identification of the vehicle geometry data from current acquired images of the measurement and reference targets.

In a further exemplifying embodiment, the image acquisition units as well as the evaluation unit are embodied for periodic or continuous imaging of the measurement and reference targets, thereby ensuring that the position of the measuring units with respect to one is regularly updated.

In a further exemplifying embodiment, the optical device is a prism, a beam splitter, a mirror, a lens, or a combination of said elements, with which images of the measurement and reference targets can be imaged onto the image regions of the image acquisition unit that are intended therefor.

The invention further relates to a measuring station having standing thereon a motor vehicle on whose wheels measurement targets are mounted, and which encompasses an apparatus of the kind described above for measuring the running gear of a motor vehicle.

The invention furthermore encompasses a method for measuring the running gear of a motor vehicle in accordance with the independent method claim. A method of this kind realizes the advantages described above, and all embodiments described above with reference to the apparatus, and advantages connected therewith, are correspondingly relevant in terms of method and will not be repeated again here.

The invention is explained below in further detail on the basis of several exemplifying embodiments with reference to the accompanying Figures.

BRIEF DESCRIPTION OF THE DRAWINGS

FIG. 1 schematically depicts a measuring station having an apparatus for measuring the running gear of a motor vehicle and having measurement targets mounted on wheels of a motor vehicle that is to be measured, in accordance with an exemplifying embodiment of the invention.

Figure 2:
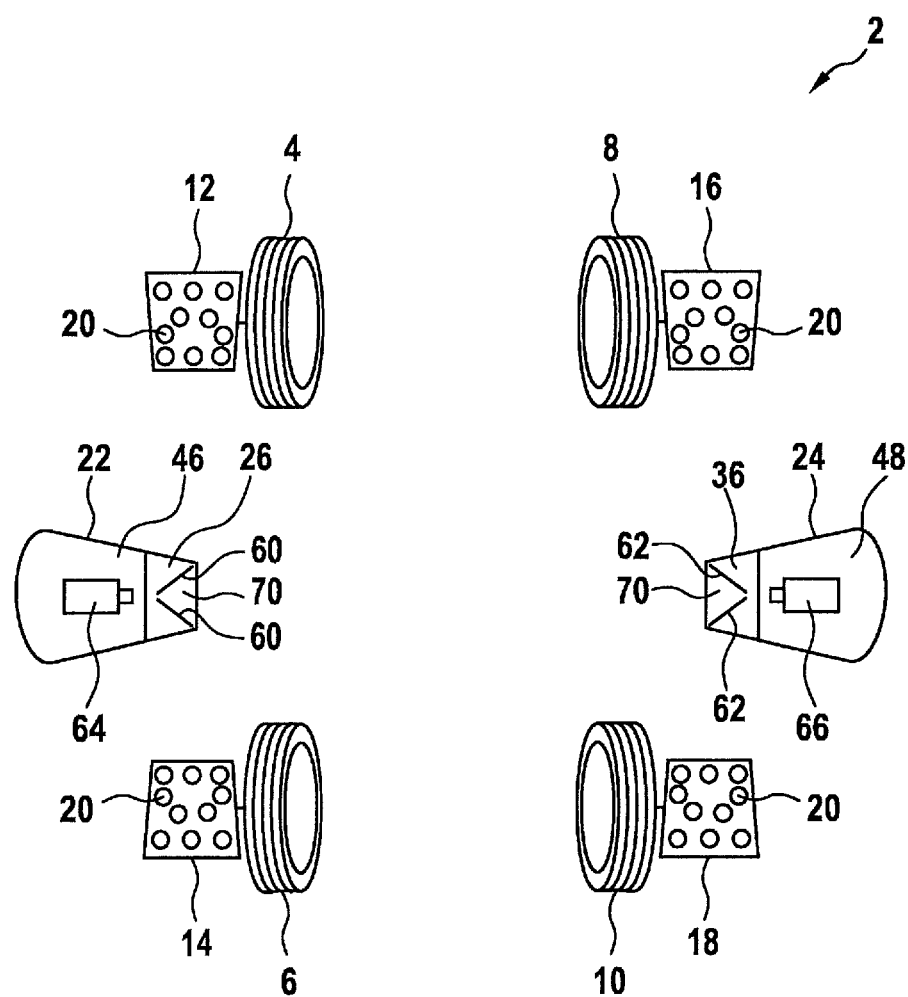

FIG. 2 schematically depicts the measuring station of FIG. 1 with a more detailed view of the apparatus for running gear measurement.

Figure 3:
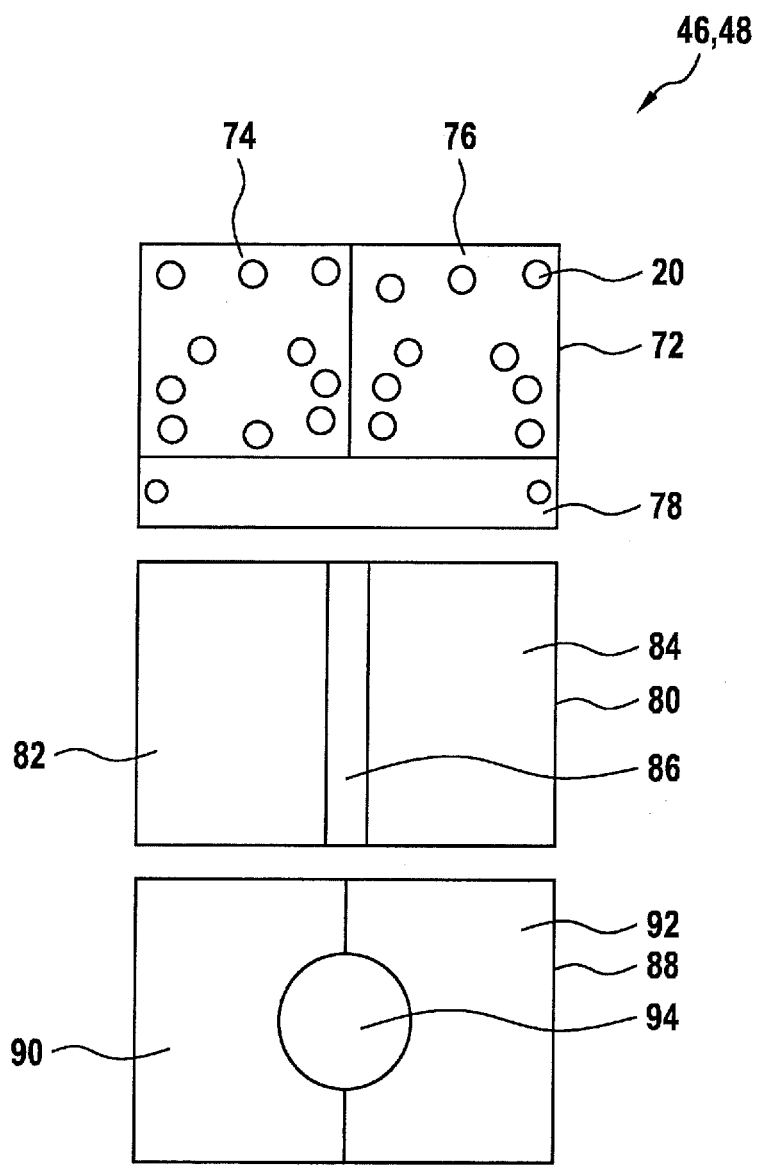

FIG. 3 schematically depicts three image acquisition surface regions of an image acquisition unit of the apparatus for running gear measurement of FIG. 1.

Figure 4:
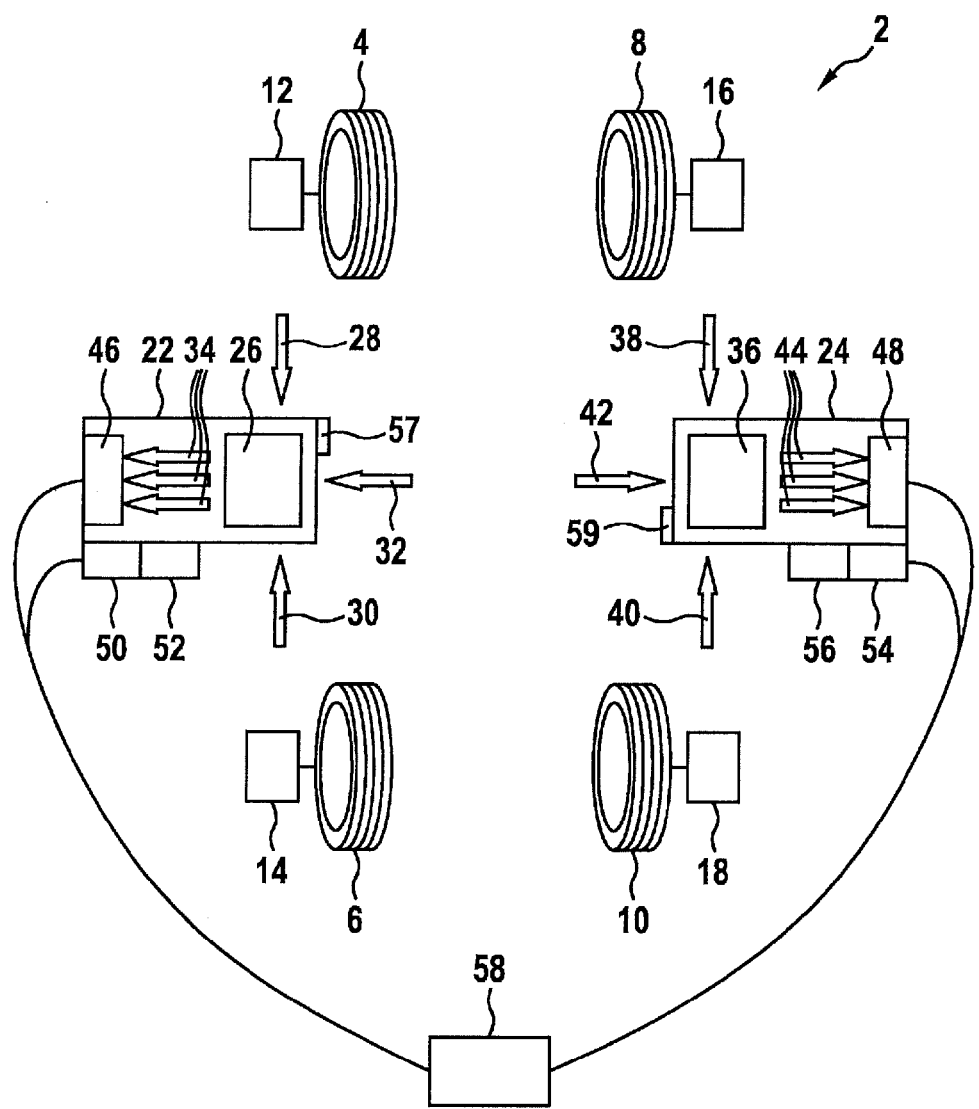

FIG. 4 schematically depicts a measuring station having an apparatus for measuring the running gear of a motor vehicle and having measurement targets mounted on wheels of a motor vehicle that is to be measured, in accordance with a further exemplifying embodiment of the invention.

DETAILED DESCRIPTION OF THE INVENTION

FIG. 1 schematically depicts a measuring station 2 having an apparatus for measuring the running gear of a motor vehicle. For reasons of clarity, only the four wheels 4, 6, 8, 10 of the motor vehicle are shown in FIG. 1. The apparatus for running gear measurement is made up of a left and a right measuring unit 22, 24 that are located oppositely from one another with reference to the longitudinal axis (not depicted) of the motor vehicle. The measuring station shown in FIG. 1 is substantially symmetrical with respect to the longitudinal axis of the motor vehicle, and for that reason the configuration will firstly be described by way of example with reference to the left side of the motor vehicle.

In the example depicted in FIG. 1, left measuring unit 22 is disposed centeredly on a left side of the motor vehicle between left front motor vehicle wheel 4 and left rear motor vehicle wheel 6. Left measuring device 22 contains a left optical device 26 as well as a left image acquisition unit 46. Also located on the left side of the motor vehicle are a left front measurement target 12 on front wheel 4 and a left rear measurement target 14 on rear wheel 6. Measurement targets 12, 14 are mounted via an adapter on motor vehicle wheels 4, 6, at the height of the center axes of the respective motor vehicle wheels 4, 6, in such a way that they protrude to the left in an axial direction and are located in the field of view of left measuring unit 22. Also located on left measuring unit 22 is a left reference target 57, mounted by way of example at the top right side of measuring unit 22. A reference target 57 of this kind can be, for example, an individual LED that is mounted on measuring unit 22, 24 at a known position, or two or more LEDs located in a row, the LEDs being disposed in a known position with respect to one another. Reference target 57 can also encompass multiple light spots, in particular LEDs, in one surface at respectively predetermined spacings from one another, or light spots, in particular LEDs, located in different surfaces and planes.

Left optical device 26 is disposed in a right region of measuring unit 22 and centeredly between left front measurement target 12 and left rear measurement target 14. Image acquisition unit 46 is disposed to the left of and behind it.

The positioning depicted in FIG. 1 of measuring units 22, 24 between the respective measurement targets 12, 14, 16, 18 is merely exemplifying. Measuring units 22, 24 can be disposed on the left and right side of the motor vehicle, or in front of and behind the motor vehicle, in any position from which measurement targets 12, 14, 16, 18 on motor vehicle wheels 4, 6, 8, 10 of the respective side of the motor vehicle are visible.

Also shown in FIG. 1 are optical light paths depicted with arrows. A light path 28 extends from left front measurement target 12 to left optical device 26, and a light path 30 extends from left rear measurement target 14 to left optical device 26. Also shown in an optical light path 32 that extends from a reference target 59 fastened on the oppositely located right measuring unit 24 toward left optical device 26. Left optical device 26 directs light paths 28, 30 and light path 32 to a common light path 34 that is depicted in FIG. 1 in the form of three arrows and that strikes left image acquisition unit 46. Images of measurement targets 12, 14 and of reference target 59 of the oppositely located measuring unit 24 are thereby imaged onto the image acquisition surface of left image acquisition unit 46.

Located on the right side of measuring station 2, disposed symmetrically with respect to the above-described left side of measuring station 2, are a right measuring unit 24 that has a right optical device 36, a right image acquisition unit 48, and a right reference target 59, and two measurement targets 16, 18 disposed respectively on right motor vehicle wheels 8, 10. Correspondingly to the above-described left side of the measuring station, light paths 38, 40, 42 coming from right measurement and reference targets 16, 18, 57 are directed onto right optical device 36 and are directed by right optical device 36 as a common light path 44 onto the image acquisition surface of right image acquisition unit 48.

FIG. 1 furthermore shows an evaluation device 58 that is connected via a cable to left image acquisition unit 46 and to right image acquisition unit 48.

FIG. 2 shows a measuring station 2 according to FIG. 1, the left and right optical device 26, 28 of the respective measuring unit 22, 24, as well as measurement targets 12, 14, 16, 18, being depicted in more detail.

Unlike in FIG. 1, evaluation device 58, reference targets 57, 59, and optical light paths 28, 30, 32, 38, 40, 42 incident onto right and left optical device 26, 36 are not shown in FIG. 2 for reasons of simplification.

Measurement targets 12, 14, 16, 18 are shown enlarged in FIG. 2. Each measurement target 12, 14, 16, 18 is made up of a substantially square plate whose horizontal center line is parallel to the respective vehicle wheel axis. Located on measurement targets 12, 14, 16, 18 are optical target features 20 disposed in a specific pattern. Target features 20 in FIG. 2 are of circular configuration. By way of example, ten such target features 20 are depicted on measurement targets 12, 14, 16, 18 depicted in FIG. 2, the pattern in which target features 20 are disposed being the same on each of measurement targets 12, 14, 16, 18. Target features 20 are disposed symmetrically with respect to a vertical center line of measurement targets 12, 14, 16, 18. This is merely an exemplifying target feature disposition; any desired dispositions, number, and sizes of target features 20 are conceivable. FIG. 2 moreover shows that the plate-shaped measurement targets 12, 14, 16, 18 are disposed at an angle of, for example, 30° with respect to the motor vehicle support surface.

An image acquisition unit 46, 48 and an optical device 26, 36 are disposed respectively in the left and the right measuring unit 22, 24 of FIG. 2, each image acquisition unit 46, 48 encompassing a camera 64, 66. Optical devices 26, 36 each contain an optical beam splitter 70 that is constituted from a mirror assemblage 60, 62. Mirror assemblages 60, 62 encompass two mirrors that, by way of example, are at right angles to one another, the front one of the two mirrors being at an angle of 45° with respect to the vertical in the transverse vehicle direction, and the rear one of the two mirrors of a mirror assemblage 60, 62 being at an angle of −45° with respect to the vertical in the transverse vehicle direction. In the exemplifying embodiment of FIG. 2, the mirrors are at a short distance from one another and do not touch each other. Cameras 64, 66 are directed onto the mirror assemblages 60, 62 of the respective measurement devices 22, 24 so that the light paths deflected by mirror assemblages 60, 62 from the front and from the rear toward the side respectively strike cameras 64, 66 and can be acquired there.

FIG. 3 shows three examples of an image acquisition surface 72 present in image acquisition units 46, 48.

Upper image acquisition surface 72 has a rectangular shape that is subdivided into three rectangular image regions 74, 76, 78. First and second image region 74, 76 divide an upper region of image acquisition surface 72 at the vertical center line into two image regions 74, 76 of equal size, and occupy approximately three-quarters of the total image acquisition surface 72. Third image region 78 encompasses a horizontal lower longitudinal strip of approximately one-quarter of image acquisition surface 72.

Images of target features 20 of measurement and reference targets 12, 14, 16, 18, 57, 59 are shown by way of example on image regions 74, 76, 78; the images on first image region 74 correspond to the ten target features 20 of front measurement target 12, 16, and the images on second image region 76 correspond to the ten target features 20 of an associated rear measurement target 14, 18. An image of reference target 57, 59 is imaged on third image region 78, a target feature 20 of reference target 57, 59 being depicted respectively on the left and right edge of third image region 78.

In the further exemplifying embodiments of image acquisition surfaces 60, 88 depicted in FIG. 3, the images of target features 20 are not depicted for the sake of simplicity.

Image acquisition surface 80 of FIG. 3 is subdivided vertically into three image regions 82, 84, 86. The first and the second image region 82, 84 are identical in size and are located respectively at the outer right edge and outer left edge of image acquisition surface 80. Third image region 86 is located between first and second image regions 82, 84, and encompasses less than a quarter of image acquisition surface 80.

FIG. 3 furthermore shows an image acquisition surface 88 that is subdivided into three image regions 90, 92, 94, third image region 94 being circular and being located in the center of image acquisition surface 88. First image region 90 constitutes the left side, and second image region 92 the right side, of the image acquisition surface, the first and the second image region 90, 92 being identical in size and symmetrical with respect to one another.

FIG. 4 shows all the elements of FIG. 1, an inclination sensor and a motion sensor additionally being disposed respectively on measuring units 22 and 24. Left inclination sensor 50 is located in the lower left region of measuring unit 22, and disposed next to it on the right is left motion sensor 52. The inclination and motion sensors 50, 50 of each measuring unit 22, 24 are additionally connected to evaluation device 58.

The manner of operation of the apparatus for measuring the running gear of a motor vehicle is explained below by way of example, with reference to measurement of the left side of the motor vehicle using left measuring unit 22.

Optical device 26 directs the light paths from measurement and reference targets 12, 14, 59 onto image acquisition unit 46. In the exemplifying embodiment shown in FIGS. 1 and 2, light path 28 from left front measurement target 12 is deflected by the upper mirror of mirror assemblage 60 through a 90° angle toward image acquisition unit 46, and light path 30 from left rear measurement target 14 is deflected by the rear mirror of mirror assemblage 60 through a 90° angle toward image acquisition unit 46. The light path from reference target 59 is not deflected in the exemplifying mirror assemblage 60 in FIG. 2. Light paths 28, 30, 32 strike image acquisition unit 46; as shown in FIG. 3, light path 28 from left front measurement 12 generates an image on first image region 74, light path 30 of left rear measurement target 14 generates an image on second image region 76, and light path 32 of reference target 59 generates an image on third image region 78 of image acquisition unit 46. The shape of regions 74, 76, 78 depends on mirror assemblage 60.

The images sensed by image acquisition unit 46 are then evaluated by evaluation device 58 in order to calculate the alignment of wheels 4, 6. In the same manner, the images of measurement and reference targets 16, 18, 57 are sensed by right image acquisition unit 48 and analyzed by evaluation device 58 in order to calculate the alignment of the wheels of the right side of the motor vehicle.

For evaluation, evaluation device 58 compares image regions 74, 76, 78 of image acquisition units 46, 48 with reference data. These reference data encompass images of the measurement and reference targets which were acquired at a known angle and a known distance and are stored in the evaluation device.

The alignment of wheels 4, 6 of the left side is identified by evaluation device 58 by comparing the images of left measurement targets 12, 14, and of optical target features 20 thereof, on first and second image region 74, 76 with reference images of measurement targets 12, 14. The alignment of right measurement targets 16, 18 relative to right measuring unit 24 is determined in the same fashion.

To allow identification of the position of left measurement targets 12, 14 relative to right measurement targets 16, 18, the position and orientation of left measuring unit 22 relative to right measuring unit 24 can be identified. This purpose is served by left and right reference targets 57, 59, the relative position of reference targets 57, 59 with respect to one another being identified by way of evaluation unit 58.

This is determined by evaluating the images of reference targets 57, 59 on image regions 78, 86, 94 of image acquisition unit 46, 48.

Identification of the alignment of measuring units 22, 24 with respect to one another can be carried out in various ways that depend on the nature of the respective reference targets 57, 59.

For example, reference target 57, 59 can be embodied in point-like fashion, i.e. can be made up of a single LED; this requires that, in order to determine the relative position of measuring units 22, 24 with respect to one another, the spacing of the two measuring units 22, 24 with respect to one another in the transverse vehicle direction be known and be stored in evaluation device 58, and that an inclination sensor 50, 54 be present on each of measuring units 22, 24, which sensor is connected to evaluation device 58 and determines the inclination of the respective measuring unit 22, 24, as shown in FIG. 4 with reference to reference characters 50 and 54.

From the image of reference target 57, 59 (made up of an LED) on the associated image region 78, 86, 94 of the image acquisition surface, the alignment of measuring units 22, 24 relative to one another in the longitudinal vehicle direction can then be determined by the evaluation device.

If reference target 57, 59 is made up of a two-dimensional target, i.e. of a number of light spots, in particular LEDs, in a line, the position of the measuring units with respect to one another, i.e. the spacing and the angular displacement of the measuring units, can be calculated from a comparison between the image of the 2D target and a reference image.

This requires that an inclination sensor 50, 54 be present at each of measuring units 22, 24, which sensor is connected to evaluation device 58 and determines the inclination of the respective measuring unit 22, 24 as shown in FIG. 4 with reference to reference characters 50 and 54. The spacing of the two measuring units 22, 24 with respect to one another in the transverse vehicle does not need to be known for this.

A three-dimensional target having a known assemblage of optical target features 20 requires neither an inclination sensor 50, 54 nor a knowledge of the spacing of measuring units 22, 24 in the transverse vehicle direction in order to determine the position of measuring units 22, 24.

The calculation of the alignment of measuring units 22, 24 relative to one another can be updated on an ongoing basis; this can be carried out in various ways.

As depicted in FIG. 4, a motion sensor 52, 56 can additionally be provided for this purpose in each of measuring units 22, 24, which sensor detects a motion of the respective measuring units 22, 24 and thereupon triggers imaging of measurement targets 12, 14, 16, 18 and of reference targets 57, 59, which are then evaluated by evaluation device 58.

Periodic or continuous updating of the measured data is likewise possible. In this context, imaging of measurement and reference targets 12, 14, 16, 18, 57, 59 is carried out at predetermined time intervals, and these data are evaluated by evaluation device 58.

The optical data of reference targets 57, 59 can furthermore be continuously monitored so that the position of measuring units 22, 24 relative to one another can be recalculated as soon as a change in the data is detected.

What is claimed is:

1. An apparatus for measuring a running gear of a motor vehicle, comprising:
   a left measuring unit positioned on a left side of the motor vehicle, in such a way that a measurement target on a left front wheel and a measurement target on a left rear wheel of the motor vehicle are sensed from the left measuring unit;
   a right measuring unit positioned on a right side of the vehicle, in such a way that a measurement target on a right front wheel and a measurement target on a right rear wheel of the motor vehicle are sensed from the right measuring unit; and
   an evaluation device configured to identify vehicle geometry data by comparing images of the measurement targets on the front wheels and images of the measurement targets on the rear wheels with reference images of the measurement targets;
   wherein each of the left and right measuring units includes: a reference target visible from the respective other measuring unit; an image acquisition unit sensing (i) an image of the respective measurement target on the respective front wheel, (ii) an image of the respective measurement target on the respective rear wheel, and (iii) an image of the reference target; and an optical device disposed and configured to direct the image of the respective measurement target on the respective front wheel, the image of the respective measurement target on the respective rear wheel, and the image of the reference target to the image acquisition unit; and
   wherein the evaluation device is configured to identify relative positions of the reference targets,
   wherein:
   each of the image acquisition units includes a single image acquisition surface having three separate, non-overlapping image regions: a first image region, a second image region, and a third image region;
   each of the optical devices is disposed and configured to direct (i) the image of the respective measurement target of the respective front wheel onto the respective first image region, (ii) the image of the respective measurement target of the respective rear wheel onto the respective second image region, and (iii) the image of the respective reference target onto the respective third image region; and
   each of the optical devices is disposed and configured to prevent the images of the measurement targets and the reference target from being directed onto adjacent image regions.

2. The apparatus as recited in claim 1, wherein the evaluation device is configured to identify the relative positions of the reference targets based on a comparison of the sensed images of the reference targets with reference images of the reference targets.

3. The apparatus as recited in claim 2, wherein:
   each of the reference targets is configured as an LED;
   each of the measuring units has an inclination sensor; and
   the evaluation device identifies the vehicle geometry data based on inclinations of the measuring units and a known spacing of the measuring units in the transverse vehicle direction.

4. The apparatus as recited in claim 2, wherein:
   each of the reference targets is configured as at least two LEDs disposed on a line at a predetermined spacing;
   each of the measuring units has an inclination sensor; and
   the evaluation device (i) determines a spacing and an angular displacement of the measuring units with respect to one another based on comparing the images of the references targets sensed by the image acquisition units with the reference images of the reference targets, and (ii) utilizes the spacing in the transverse vehicle direction and the angular displacement of the measuring units, as well as inclinations of the measuring units, to identify the vehicle geometry data.

5. The apparatus as recited in claim 2, wherein:
   each of the reference targets is configured as multiple LEDs disposed one of (i) on one surface at a predetermined spacing from one another, or (ii) on different surfaces and planes; and
   the evaluation device (i) determines a spacing and an angular displacement of the measuring units with respect to one another, as well as inclinations of the measuring units, based on comparing the images of the references targets sensed by the image acquisition units with the reference images of the reference targets, and (ii) utilizes the spacing and the angular displacement of the measuring units, as well as inclinations of the measuring units, to identify the vehicle geometry data.

6. The apparatus as recited in claim 2, wherein at least one motion sensor is provided on at least one of the measuring units, and wherein the at least one motion sensor triggers imaging of the measurement targets and the reference targets by the image acquisition units when the at least one motion sensor detects one of a motion of at least one of the measuring units or a motion of the motor vehicle.

7. The apparatus as recited in claim 6, wherein the at least one motion sensor triggers imaging of the measurement targets and the reference targets by the image acquisition units when the at least one motion sensor detects a motion of at least one of the measuring units.

8. The apparatus as recited in claim 2, wherein the image acquisition units and the evaluation unit are configured to provide at least periodic imaging of the measurement targets and the reference targets.

9. The apparatus as recited in claim 2, wherein the optical device includes at least one of a prism, a beam splitter, a mirror, and a lens.

10. The apparatus as recited in claim 2, wherein the apparatus is part of a measuring station accommodating the motor vehicle, and wherein the measurement targets are mounted on the respective wheels.

11. The apparatus as recited in claim 1, wherein each of the optical devices directs the images of the measurement targets and reference targets onto the single image acquisition surface simultaneously.

12. A method for measuring a running gear of a motor vehicle, comprising:
   mounting on each wheel of the motor vehicle a respective measurement target;
   positioning a left measuring unit on a left side of the motor vehicle in such a way that the measurement target on a left front wheel and a measurement target on a left rear wheel of the motor vehicle are sensed from the left measuring unit, wherein the left measuring unit has a first optical device, a first image acquisition unit, and a first reference target, wherein the first reference target is visible from a right measuring unit;
   positioning a right measuring unit on a right side of the motor vehicle in such a way that the measurement target on a right front wheel and a measurement target on a right rear wheel of the motor vehicle are sensed from the right measuring unit, wherein the right measuring unit has a second optical device, a second image acquisition unit, and a second reference target, wherein the second reference target is visible from the left measuring unit;
   directing an image of the measurement target on the left front wheel, an image of the measurement target on the left rear wheel, and an image of the second reference target, by way of the first optical device of the left measuring unit, onto the image acquisition unit of the left measuring unit;
   directing an image of the measurement target on the right front wheel, an image of the measurement target on the right rear wheel, and an image of the first reference target, by way of the second optical device of the right measuring unit, onto the image acquisition unit of the right measuring unit;
   identifying the vehicle geometry data by comparing the images of the measurement targets on the front and rear wheels with reference images of the measurement targets; and
   identifying the relative positions of the reference targets;
   wherein:
      the first image acquisition unit includes a single image acquisition surface having three separate, non-overlapping image regions: a first image region, a second image region, and a third image region;
      the first optical device is disposed and configured to direct (i) the image of the measurement target of the left front wheel onto the first image region, (ii) the image of the measurement target of the left rear wheel onto the second image region, and (iii) the image of the first reference target onto the third image region; and
      the first optical device is disposed and configured to prevent the images of the measurement targets and the image of the first reference target from being directed onto adjacent image regions.

13. The method as recited in claim 12, wherein the sensed images of the first and second reference targets are compared with reference images of the first and second reference targets to identify the relative positions of the first and second reference targets.

14. The method as recited in claim 12, wherein:
   the second image acquisition unit includes a single image acquisition surface having three separate, non-overlapping image regions: a first image region, a second image region, and a third image region;
   the second optical device is disposed and configured to direct (i) the image of the measurement target of the right front wheel onto the first image region, (ii) the image of the measurement target of the right rear wheel onto the second image region, and (iii) the image of the second reference target onto the third image region; and
   the second optical device is configured to prevent the images of the measurement targets and the image of the second reference target from being directed onto adjacent image regions.

15. The method as recited in claim 14, wherein each of the optical devices directs the images of the measurement targets and the reference target onto the single image acquisition surface simultaneously.

* * * * *